Sept. 9, 1952   T. F. PETERSON   2,609,653
HELICALLY-PREFORMED ELEMENTS ON STRANDED LINE
Filed April 27, 1948
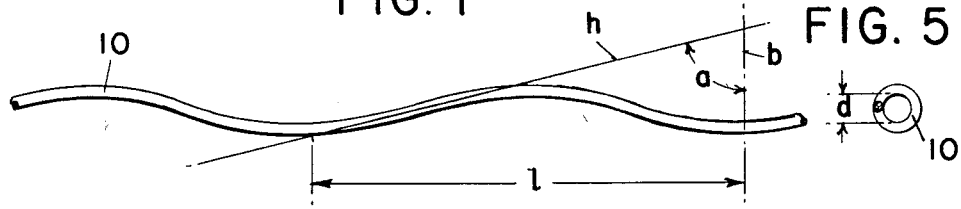
a = angle of lay or pitch angle of armor rod.
l = length of lay or pitch length of armor rod.
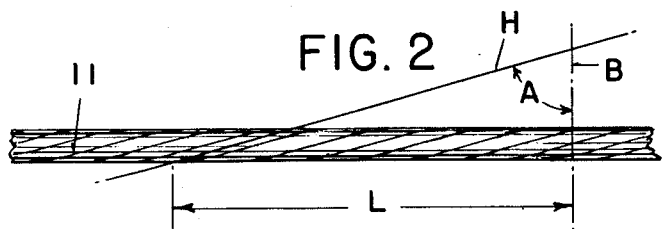 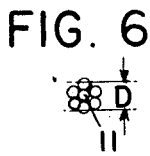
A = angle of lay or pitch length of conductor strands.
L = length of lay or pitch length of conductor strands.
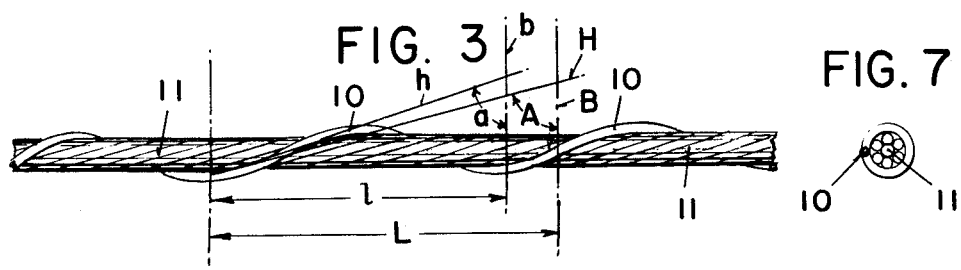 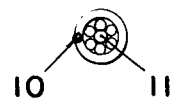
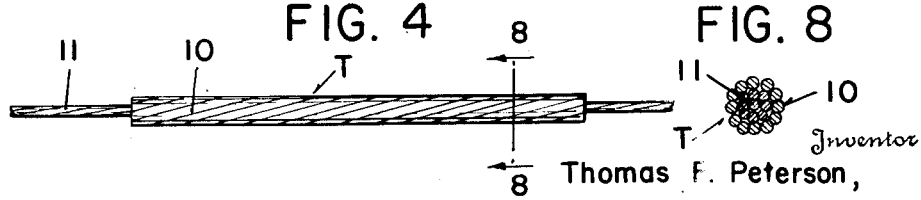 
Inventor
Thomas F. Peterson,
By
Attorney Patented Sept. 9, 1952

2,609,653

UNITED STATES PATENT OFFICE 2,609,653

HELICALLY PREFORMED ELEMENTS ON STRANDED LINE

Thomas F. Peterson, Shaker Heights, Ohio, assignor to Preformed Line Products Company, Cleveland, Ohio, a corporation of Ohio Application April 27, 1948, Serial No. 23,579

2 Claims. (Cl. 57—145)

This invention relates to helically preformed elements for use in the reinforcement, armoring, connecting, and supporting of wires, strands, and the like. In this regard the invention is in furtherance of those disclosed in my prior Patents Nos. 2,275,019 and 2,587,521, and copending applications Serial Nos. 698,312 and 2,200 (Series of 1948).

This invention has two principal functions, one of which has to do with the mechanical aspects with regard to connecting, reinforcing, or splicing stranded wires, cables etc., and the other of which is concerned with the electrical connection with and/or union between conductors of this kind. Insofar as the mechanical features are concerned, the composition of the helical element is unimportant so long as the strength and resiliency of the helix and the considerations of mass and dimension are within the realm of the practicable for the purposes and uses intended. In the case of electric conductors, it is obvious that the helical elements should be made of conductive or semi-conductive material, the most suitable and obvious material for this purpose being metallic rods and wire, although the invention is not limited thereto.

As is discussed in my prior patent applications, in order to effect the best mechanical and electrical connection between adjacent ends of stranded cables or conductors, it is desirable to preform the helical elements in such a way that the angle and length of the pitch of the helix correspond to the angle and length of lay of the strands of the conductor of association in order that the former may lie between, and track with, any two adjacent strands of the latter where these are of the same hand. By this arrangement the greatest line contact between the helical elements and the conductor strands is realized which develops the highest frictional engagement to resist relative axial displacement between the two, and also provides the greatest areas of contact for the electrical purpose, thereby effecting a union of the highest efficiency in these relationships.

Notwithstanding the above desiderata, there is the fact that helices so preformed to this ideal pitch are subject to axial distortion when applied to stranded bodies working under tensional loads of relatively high values, as are encountered in overhead transmission line assemblies and in other suspended strand constructions. The tendency is for the helical elements to be elongated so that their position between adjacent strands of the associated conductor is disarranged to the extent that they tend to pull out of the inter-strand groove and ride up over adjacent strands to positions which are less efficient in the matter of contact from both the electrical and mechanical view points. As is well known, if a helix is stretched so as to increase its pitch length, its effective helical diameter is diminished. Therefore, in the elongated condition of load, mentioned above, the helical element exerts its greatest constrictive effort in the new disarranged position, and thus tends to build up high unit stresses at points where it rides over the strands of the associated conductor. Such stresses may be of a magnitude sufficient to notch or indent the strands, as well as the helical elements themselves, to afford places of low resistance to fatigue. Having started from an ideal condition, then, the arrangement of an accurately preformed helix tracking in the inter-stranded grooves of a conductor must change for the worse, if it changes at all, so as to result in an electrical and mechanical bond that is inferior to that originally constituted.

The present invention is aimed at curing these defects by providing for a helical element that is preformed with an angle of pitch that is less than the angle of lay of the associated stranded body, and with a pitch length that is less than the length of lay of the latter.

These modifications must be made with due regard to the retention of an open helix which may be applied from the side of stranded conductors without necessitating deformation of the helix in excess of the elastic limit of the material of which it is made. By this construction, the mechanical and electrical relationships are initially satisfactory, even if less than optimum; and any change must, from this initial condition, be for the better by virtue of the fact that the helical element comes more closely into a condition of tracking, and approaches the greatest contact with the underlying stranded body, both for mechanical and electrical purposes.

Another advantage is gained by this arrangement in that the helical element, when preformed to an angle of pitch that is less than the angle of lay of the stranded conductor of association, tends to ride over the adjacent strands as an initial condition and thus contact each of them for electrical purposes, instead of tracking between any two strands, which is effective only to transmit the current flowing in those two to corresponding strands across the joint.

These and other objects and advantages will become more readily apparent hereafter when the following specification is read in conjunction with the accompanying drawings in which:

Figure 1 is a side elevational view of a helical element on which the pitch angle and the pitch length are designated by the letters $a$ and $l$.

Figure 2 is a side elevational view of a section of a stranded body which may be regarded as an electrical conductor in which the angle of lay and the length of lay are represented by A and L respectively.

Figure 3 is a side elevational view showing the application of the helical element of Figure 1 to the stranded body of Figure 2, offering a comparison between the angles of pitch and lay, and the respective lengths thereof, as shown in those figures.

Figure 4 is a side elevational view of a stranded conductor having a plurality of helical elements made in accordance with the present invention assembled thereon to provide a closed tube which acts as a connector or splice for a joint in the conductor (not shown).

Figures 5 to 8 inclusive are end views of Figures 1, 2, and 3, and a section view taken along line 8—8 of Figure 4, respectively.

Referring now more particularly to the drawings, a helical element 10, which may be comprised of any suitable material, but which, for simplicity of illustrations, may be regarded as hard-drawn wire preformed into a helix, has a pitch angle $a$ defined by the tangential projection $h$ of the helix taken in regard to a line $b$ erected normal to the helical axis, and a pitch length $l$ which is the distance between corresponding points on adjacent turns of the helix.

One or more of the helical elements 10 are applied to connect, splice, or reinforce pairs of cables or electrical conductors similar to that shown at 11 in Figure 2, whose angle of lay or pitch angle A, and length of lay or pitch length L, are determined by the course of any one strand in the body in the same manner as that already described in the case of the helical element of Figure 1. The pitch angle A is defined by the tangential project H of any course of strand taken in relation to a line B erected normal to the longitudinal axis of the conductor 11. As shown in Figure 3, and in accordance with a preferred embodiment of this invention, the pitch angle $a$ of the helical element 10 is less than the angle of lay A of the stranded conductor 11, by virtue of the fact that the pitch length $l$ of the helical element is less than the length of lay L of the stranded conductor. Since the helical element 10 is formed into a helix of larger diameter than the strands of the conductor 11, if both were to have the same pitch lengths, the angle of pitch of the helical element would necessarily be less than that of the stranded body in consequence thereof. But since equal pitch lengths would effect tracking of the helical element on the conductor, conditions of the invention are satisfied only when the pitch length of the helical element is less than the pitch length of the stranded body. This affords the condition wherein the helical element partially tracks and partially rides over the strands of the stranded body or conductor, 11, ultimately contacting all of the strands, and assuming a position which, under tension load, tends to work toward greatest line contact at the time when the constrictive component of the helical element is at its maximum. In this fashion, a highly efficient electrical and mechanical connection is accomplished.

Figure 4 is introduced for the purpose of illustrating that the helical elements, 10, may be applied in any number from one to as many as are needed to constitute the full complement of a completely closed tubular connector or reinforcement T, as shown in Figures 4 and 8.

It will be understood, as is fully disclosed in my prior patents and applications, that the helical element as initially constituted will be preformed into a helix of such an internal diameter $d$, as shown in Figure 5, smaller than the interstrand diameter D of the conductor, Figure 6, so as forcefully to embrace the latter to which it is applied to afford the greatest possible frictional engagement therewith, without sustaining that degree of deformation which would be beyond the elastic limits of the materials involved. Usually, the internal diameter $d$ of the helix 10 is 80% to 90% of the diameter D of the stranded body 11 to which it is to be applied.

It is obvious, that were the pitch angle of the helical element to exceed the angle of lay of the associated stranded body, a greater axial extent of the former would be necessary to encompass the conductor for the purpose of contacting each of the strands thereof. Under working load, a straight-line condition would be approached, and the resistance to axial slippage would be considerably reduced, as compared to the helical elements made to a shorter pitch in accordance with this invention, which afford the more inferior condition as installed, and work toward optimum electrical and mechanical relationships.

I claim as my invention:

1. In combination with a stranded line, a reinforcing and connecting device comprising a helically-preformed element having helical convolutions for disposition around said stranded line, said convolutions being of the same hand as the strands in said line and being of substantially constant pitch length throughout said element, said pitch length being slightly less than the pitch length of the strands comprising said line when said element is initially positioned thereon, said element being preformed to an internal diameter that is less than the over-all diameter of said stranded line and being elastically expanded to accommodate the latter, said element having a sufficiently open pitch for introduction to the line from its side without exceeding the elastic limit of the material of which said element is made.

2. A plurality of preformed elements surrounding a stranded line, each having the characteristics of the combination as set forth in claim 1, said elements being distributed in balanced relation around said line as regarded in right section throughout their co-extensiveness.

THOMAS F. PETERSON.

REFERENCES CITED

The following references are of record in the file of this patent:

UNITED STATES PATENTS

| Number | Name | Date |
|---|---|---|
| 1,626,777 | Austin | May 3, 1927 |
| 1,873,798 | Varney | Aug. 23, 1932 |
| 2,172,810 | Sherman | Sept. 12, 1939 |
| 2,202,538 | Selquist | May 28, 1940 |
| 2,210,587 | Klein et al. | Aug. 6, 1940 |
| 2,230,611 | Coffin et al. | Feb. 4, 1941 |
| 2,275,019 | Peterson | Mar. 3, 1942 |
| 2,421,286 | Pyle | May 27, 1947 |

FOREIGN PATENTS

| Number | Country | Date |
|---|---|---|
| 151,778 | Switzerland | Mar. 16, 1932 |
| 265,174 | England | May 19, 1927 |